Jan. 31, 1939.　　　　O. SWENSON　　　　2,145,819
THREAD CUTTING TOOL
Filed Nov. 11, 1937
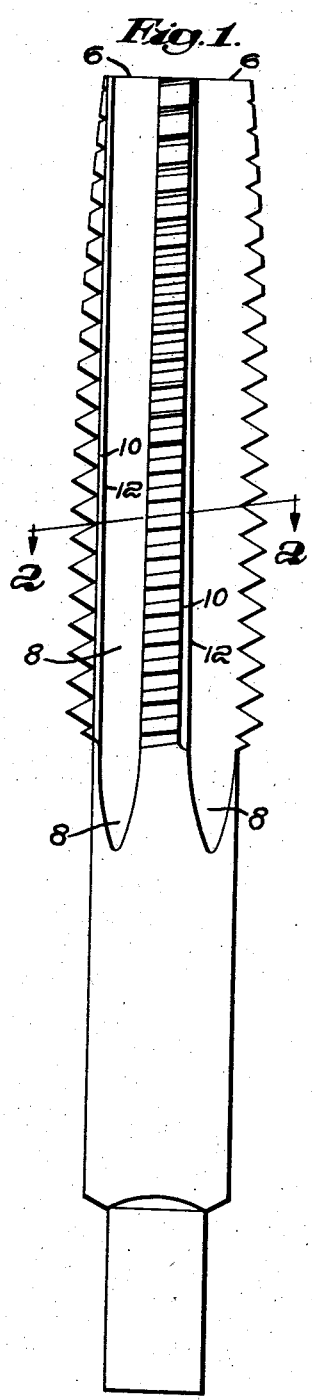
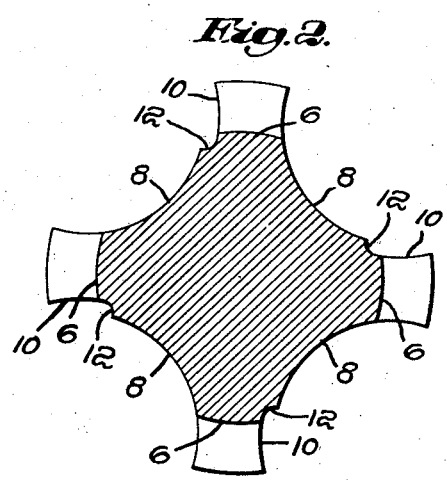
Inventor:
Oscar Swenson,
by Emery, Booth, Townsend, Mills & Varney
Attys Patented Jan. 31, 1939

2,145,819

UNITED STATES PATENT OFFICE 2,145,819

THREAD CUTTING TOOL

Oscar Swenson, Wrentham, Mass., assignor, by mesne assignments, to Winter Brothers Company, Wrentham, Mass., a corporation of Michigan Application November 11, 1937, Serial No. 174,065

3 Claims. (Cl. 10—141)

This invention relates to tools for cutting threads in metal and the object is to provide an improved construction for such a tool providing for the ready discharge of all cuttings formed during the threading operation and obviating any choking of the tool in use.

My invention will be well understood by reference to the following description of the particular embodiment thereof in a tap for cutting a female thread as shown in the accompanying drawing, wherein:—

Fig. 1 is an elevation of a tap; and

Fig. 2 is a section on the line 2—2 of Fig. 1 on an enlarged scale.

Referring to the drawing, I have there shown a tap having four longitudinal lands 6, each provided with a row of cutting teeth forming a helical series, the lands being separated by flutes 8 defining the cutting edges of the teeth and providing passages for the discharge of the cuttings. The number of lands may vary and the formation of the body of the tap and the formation and arrangement of the teeth may be of any usual or preferred type.

While my improved tool is applicable to any type of work, it finds a particular application to the threading of nut blanks formed by an extrusion process. The metal of these blanks, I assume because of some requirement of the manufacturing process, is of such a character that the tap forms therefrom a shaving or chip which curls up in the flute like a tangle of thread or fine wire and, instead of being freely discharged, chokes the flute. In accordance with my invention I therefore provide means for breaking the chip into short pieces. For this purpose the leading face of each land may be cut away, as indicated at 10, from the extremities of the teeth to a point slightly below their roots providing at the latter point an abrupt shoulder 12. The end of the chip or shaving cut by a tooth is thrust endwise against the shoulder, and as the cutting action continues, the chip is broken off instead of being permitted to continue unbroken along the easy curve formed by the flute 8 and to roll up into a mass. The short chips thus produced readily clear themselves through the flutes, permitting a rapid and uninterrupted completion of the threading operation.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. A tool for cutting threads in metal having a plurality of lands provided with helically arranged cutting teeth and intervening clearance recesses, the walls of the recesses at the leading sides of the lands having abrupt shoulders positioned across the path of the curling shaving cut by the teeth and closely adjacent the cutting edges of the teeth to exert a longitudinal thrust on the shaving to break the same.

2. A metal cutting tap having toothed lands and intervening flutes, the wall of the flutes at the leading sides of the lands having a longitudinal shoulder adjacent the roots of the teeth against which the shaving cut by the tool is thrust to break the same.

3. A metal cutting tap having toothed lands and intervening flutes of any usual or preferred construction but being cut away along the leading faces of the flute to a point slightly below the roots of the teeth to provide a chip breaking shoulder.

OSCAR SWENSON.